Patented July 17, 1951

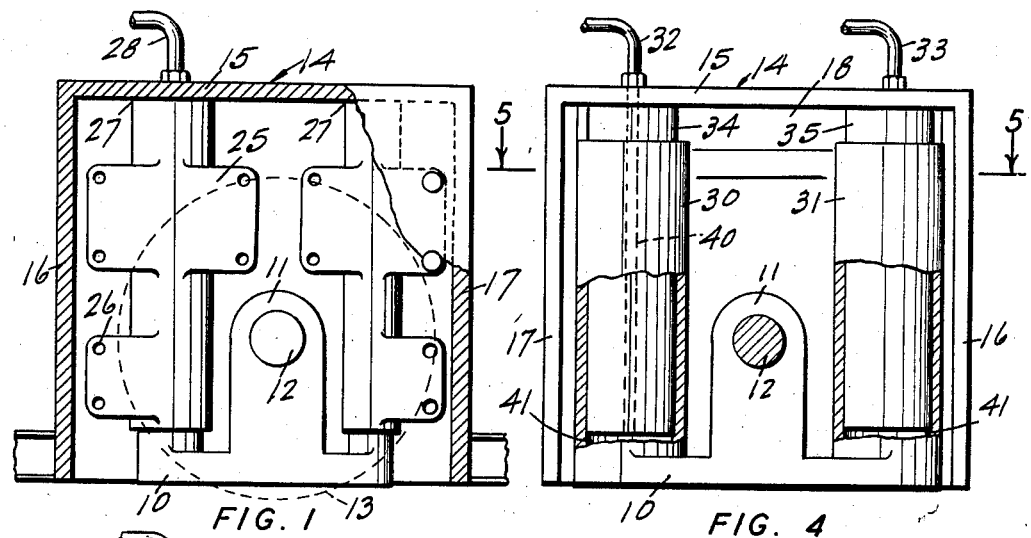
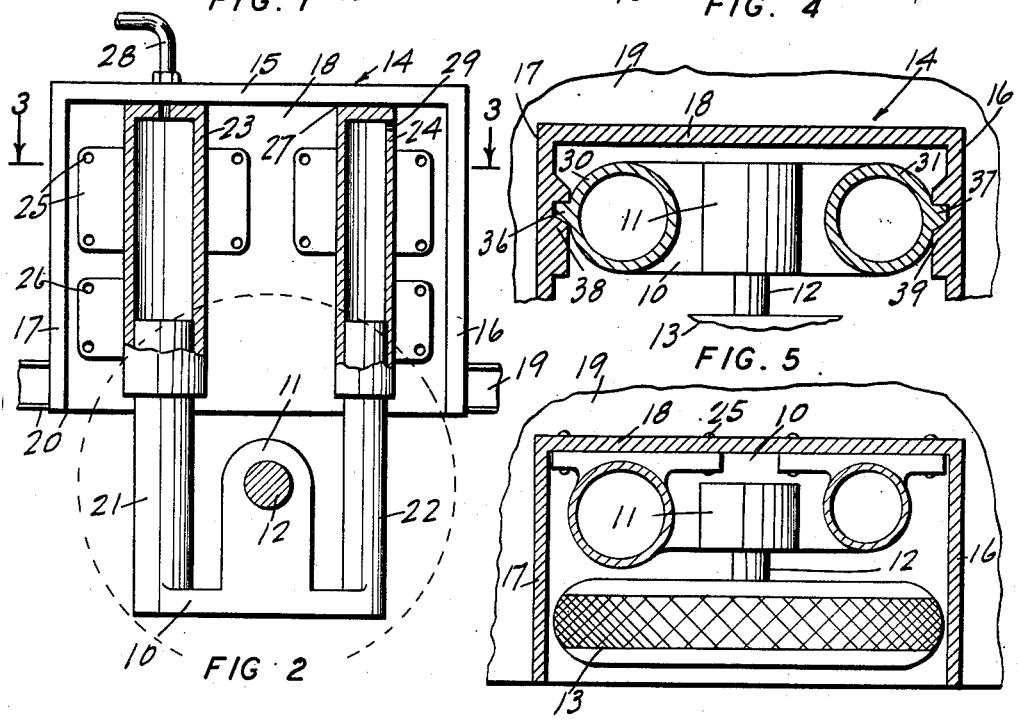
FIG. 3

2,560,714

UNITED STATES PATENT OFFICE 2,560,714

HYDRAULIC VEHICLE BODY ELEVATING AND LOWERING MEANS

Robert O. Bill, San Leandro, Calif.

Application June 24, 1948, Serial No. 34,963

6 Claims. (Cl. 280—44)

This invention relates to improvements in means for elevating and lowering vehicle bodies relative to the axle or body support and provides a new arrangement which permits the bottom of the vehicle body to be lowered sufficiently to rest on the support for the vehicle wheels.

This invention covers a modification of the rear wheel portion of the elevating and lowering means disclosed in my copending applications, Serial Numbers 27,394, now Patent No. 2,475,443, July 5, 1949, and 27,395, filed May 17, 1948, and which cover devices for application to through axles while this modification is adapted to separate stub axles for the respective rear wheels.

The objects and advantages of the invention are as follows:

First, to provide hydraulic elevating and lowering means for use with stub shafts for raising and lowering vehicle bodies.

Second, to provide elevating and lowering means as outlined which provides a rigid support in both raised and lowered positions and which will maintain the road wheel against misalignment with the axis of the body.

Third, to provide means as outlined which is relatively simple in construction and which will permit lowering of the vehicle body to ground or road level.

In describing the invention reference will be had to the accompanying drawings, in which:

Fig. 1 is an inside view of the invention with the inside wall of the wheel guard removed.

Fig. 2 is a side elevation of the invention shown in its body elevating position and partly shown in section.

Fig. 3 is a section taken on line 3—3 of Fig. 2.

Fig. 4 shows a modification in which the cylinders instead of the plungers are connected to the axle base.

Fig. 5 is a section taken on line 5—5 of Fig. 4.

The invention is applicable to all types of automotive vehicles and is particularly designed for use in connection with trailers and semi-trailers of both, the house or domestic type, and commercial types, and consists in supporting the rear end of the vehicle on stub shafts for the individual wheels instead of on a through shaft and consists of a base member 10 having an upwardly projecting axle bracket 11 in which is fixed a stub axle 12 which carries a wheel 13; a housing 14 having a top wall 15, side walls 16 and 17 and a back wall 18 with the vehicle base 19 level with the bottom of the back and side walls as indicated at 20, and which housing replaces the conventional fender and being rigidly constructed to carry the load of that portion of the vehicle.

A pair of pistons or plungers and cylinders cooperate between the respective ends of the base member 10 and the back wall or top wall of the housing, and these cylinders may be both hydraulically actuable or one may be hydraulically operable and the other function only as a resistance and anti-twisting member.

As illustrated in Figs. 1, 2 and 3, the plungers 21 and 22 are shown as formed integrally at the respective ends of the base member, though they may be attached by known means if desired. The cylinders 23 and 24 are secured to the back wall as indicated at 25 and 26 and abut against the top wall as indicated at 27.

One cylinder is operated hydraulically through a source of supply of fluid under pressure through a conduit 28 while the other cylinder is provided with a breather passage 29, that cylinder and its plunger merely functioning as a guide and torsion resisting member.

In the modification shown in Figs. 4 and 5, the cylinders 30 and 31 are both hydraulically actuated by fluid under pressure delivered through the conduits 32 and 33, with the plungers 34 and 35 integral with or secured to the top wall of the housing, and the cylinders attached to or integral with the respective ends of the axle base, these cylinders having gibs 36 and 37 which operate in gibways 38 and 39 formed in the side walls of the housing. An axial passage 40 is provided in each plunger for passage of the fluid to the space between the end of the plunger and the bottom of the cylinder indicated at 41.

Figs. 1 and 4 show the vehicle body in its lowered position while Fig. 2 shows the body in raised position. For transport, fluid is pumped through the conduits, acting on the end of the plunger and raising the vehicle body to the desired height for travel. When a destination is reached, the fluid is released to its supply tank allowing the body to settle down to rest directly on the ground or roadway, making loading and unloading easy and convenient, speeding up loading and unloading, and reducing the manpower necessary for those operations.

I claim:

1. Elevating and lowering means for a vehicle body having a road wheel, in combination; a stub axle, a bracket having said stub axle centrally fixed therein with said wheel mounted on the projecting end of the axle, said bracket having a base portion projecting in each direction from and at right angles to the axle and having a power piston integral with one end and a guide piston of lesser diameter for decreased leverage integral with the other end, and a power cylinder for the power piston and a guide cylinder for the guide piston and supported by the vehicle body, and a fluid connection for said power cylinder, said pistons being uniform in diameter throughout their height and equal in diameters to the inside diameters of the cylinders to provide rigid control means for maintaining the stub axle at right angles to the body of the vehicle.

2. A structure as defined in claim 1; said guard having a back wall, a top wall and side walls and with the side walls and back wall extending to the bottom of the vehicle body and with said cylinders and pistons having a length less than the height of the guard to permit the body to settle to the supporting surface for the wheel with the cylinders clearing the respective ends of said bracket.

3. Vehicle bed elevating and lowering, and alignment maintaining means comprising; a wheel guard having a side wall, a front wall, a rear wall, and a top wall and fixed at its lower end to the vehicle bed; a drop bracket having a stub axle fixed therein and projecting outwardly at right angles to the bed, said bracket including a drop portion below said stub axle and having a base portion projecting from each end at the bottom thereof, and each base portion having a piston integral therewith and projecting upwardly; two cylinders fixed in spaced relation on said side wall and having said pistons operating therein with the cylinders clearing said bracket; a fluid line for one of said cylinders for elevating and lowering said bed, and with the other cylinder having a breather vent and functioning in combination with said one of said cylinders and said pistons as alignment maintaining means for maintaining the axle at right angles to the longitudinal axis of the vehicle; said stub axle and drop bracket providing clearance for lowering said bed to the level of the supporting surface for the vehicle.

4. Vehicle bed elevating and lowering and wheel aligning means comprising: two vertical pistons spaced apart and having an integral crosshead spanning the lower ends with intervening stub axle bracket extending upwardly between the pistons and having a stub axle fixed therein at a point substantially one half the height of the pistons, a vehicle wheel on said stub axle; a wheel guard having front, rear and top walls and one side wall and having its lower end fixed to said bed; two cylinders fixed on said side wall and slidable on said pistons and spaced to clear said bracket, and a fluid connection for each cylinder; said pistons and cylinders coincidently functioning as elevating and lowering means and as aligning means for maintaining the stub axle at right angles to the axis of the bed.

5. Vehicle body elevating and lowering means, in combination; a combined wheel guard and support fixed to said vehicle body; two cylinders mounted on a vertical axis in spaced relation in said wheel guard and support; two pistons uniform in diameter throughout their height and slidable in said cylinders throughout their height and with the lower ends of the pistons integral with the respective ends of a crosshead, said crosshead having an intervening axle hub projecting upwardly and clearing the cylinders and having an integral stub axle projecting therefrom, and a fluid connection for said cylinders, with said cylinders and pistons coincidently functioning as elevating and lowering means and as alignment maintaining means for maintaining a wheel mounted on the stub axle in the path of travel of the vehicle.

6. Vertical adjusting and aligning means cooperative between a vehicle wheel and vehicle bed, in combination; a wheel guard having a side wall, front and rear walls and a top wall and fixed at its lower end to said bed; two cylinders having each a head seated against said top wall in spaced relation and being fixed to said side wall and being open at the lower ends and having a fluid connection for the upper end of one of said cylinders and a vent for the other; a crosshead having a central upwardly projecting axle block with a stub axle integral therewith for the vehicle wheel, and an integral piston at each end with the pistons uniform in diameter throughout their heights and slidably fitting said cylinders from top to bottom, and with the lower ends of the cylinders spaced above the lower end of the wheel guard and bottom of the vehicle frame a distance equal to the thickness of the crosshead and clearing said axle block to permit lowering of the bed to rest on the supporting surface for the vehicle wheel, with the spaced cylinders and pistons maintaining alignment of the wheel in the path of travel of the vehicle.

ROBERT O. BILL.

REFERENCES CITED

The following references are of record in the file of this patent:

UNITED STATES PATENTS

| Number | Name | Date |
|---|---|---|
| 446,799 | Thorpe | Feb. 17, 1891 |
| 2,002,605 | Kincaid | May 28, 1935 |
| 2,157,240 | Keel | May 9, 1939 |
| 2,480,909 | Davis | Sept. 6, 1949 |